United States Patent

Gebert et al.

[11] 3,899,015
[45] Aug. 12, 1975

[54] PNEUMATIC TIRES

[75] Inventors: Karl Gebert, Klein-Auheim; Otto Schmitt, Niedergrundau, both of Germany

[73] Assignee: Dunlop Limited, London, England

[22] Filed: June 12, 1973

[21] Appl. No.: 369,278

[30] Foreign Application Priority Data
June 19, 1972 Germany............ 2229888

[52] U.S. Cl............ 152/361 FP; 152/361 DM
[51] Int. Cl.²............................ B60C 9/18
[58] Field of Search.... 152/361 R, 361 FP, 361 DM

[56] References Cited
UNITED STATES PATENTS
3,473,594 10/1969 Mirtain........................ 152/361 FP
3,623,529 11/1971 Fausti......................... 152/361 FP

*Primary Examiner*—Drayton E. Hoffman
*Attorney, Agent, or Firm*—Stevens, Davis, Miller & Mosher

[57] ABSTRACT

A pneumatic tire having a tread supported by a belt. The belt contains at least two plies which are folded over to form folded edges one on either side of the center. Each of these plies extends from one shoulder region to the other and is there folded back radially outwardly upon itself.

8 Claims, 6 Drawing Figures

PNEUMATIC TIRES

This invention relates to pneumatic tires for motor vehicles, and, in particular to a pneumatic tire having a steel belt consisting of several at least partially superimposed plies of steel cord fabric.

According to the invention there is provided a pneumatic tire comprising a belt of substantially inextensible threads consisting of several at least partially superimposed plies, two of which are folded over to form folded edges one on each side of the center of the belt in which the first ply extends from a predetermined first outer peripheral line of the tire over the tire center to the opposite shoulder region, is there folded radially outwardly back upon itself and is conducted as far as a first inner peripheral line of the tire and the second ply has the same width as the first ply and extends from a second outer tire peripheral line, which lies symmetrically with the first outer peripheral line relative to the tire center over the tire center to the opposite shoulder region, is there folded radially outwardly back upon itself and is conducted as far as a second inner peripheral line of the tire, which lies symmetrically with the first inner peripheral line of the tire relative to the tire center.

The substantially inextensible threads are preferably cords or cables made up of metal wires e.g. steel wires, other materials, however, may be used if desired. With the arrangement of the plies in the belt of the tire of this invention the result is, inter alia, that during the construction of the tire, each of the two plies that are to be folded can initially be stuck fast already on a large surface of the carcass or of the first belt ply and subsequently a well defined folding step can be undertaken in a manner which enables accurate positioning of the belt edges. Since, in most cases, the folding-over for the two layers that are to be folded can be undertaken also simultaneously, it is possible to manufacture the belt in accordance with the invention in a particularly economical manner during the tire construction. Through the symmetrical distribution of the plies, a particularly good distribution of rigidity between tire center and shoulder regions is achieved, which in turn has as a result a more even wear pattern. Likewise, a substantially more exact construction is possible, since neither angular distortions at the joint point and the folded-round edges nor unequal belt widths occur.

Preferably, the folded edges of the two plies lie outside said outer peripheral lines of the tire. If desired the width of the layers may be selected in such a way that on each side of the center of the belt an outer and an inner said peripheral line substantially coincide.

Preferably the width of the folded-over portions of the two plies of the belt is greater than the width of the ply overlap region between the inner peripheral lines of the tire. In this way, a desired cross bracing is obtained in the plies through their folded-over portions over the greatest part of the belt width.

In a further preferred embodiment of the invention an additional unfolded layer is arranged at least in the ply overlap region between the inner peripheral lines of the tire.

Preferably the width of each folded-over portion of the plies amounts to less than a quarter of the entire belt width. This has the consequence that during the folding of the plies only very insignificant angular changes in the bias angles of the threads occur, which are fully reversible, so that permanent distortions can be reliably precluded.

Preferably, the threads of the plies of the belt form an angle in the range 10° to 25° with the peripheral lines of the tire. To achieve a more rigid bracing of the belt an additional unfolded ply may be provided in the case of specific embodiments, and can possess a bias angle in the range 15° to 90°.

A further feature of the invention is that in manufacture the folded plies are out at their ends in the direction of run of the threads. This has the result that normal joint points are obtained, i.e. that the oblique ends of the individual folded layers match and during the building of the belt no repeated loosening of already stuck regions of the plies and also no pushing-in of parts of plies under the connecting end is required.

A consequence of these matching belt joints is a substantially increased construction efficiency, since the production of the joints is possible without any difficulties with great exactness.

The pneumatic tire of this invention may be a radial ply tire having a carcass comprising a single ply of threads extending from bead to bead at 90° to the midcircumferential plane of the tire or a pair of plies of textile threads extending from bead to bead at equal and opposite bias angle slightly less than 90°, e.g. between 80° and 90°. If desired, however, the tire may, for example, include a carcass which comprises elastomeric material which is unreinforced or is only reinforced in part e.g. by bead cores and plies of threads extending from the bead cores into the sidewalls.

The invention will now be explained in more detail, by way of example only, with reference to the accompanying drawings in which.

Figure 1:
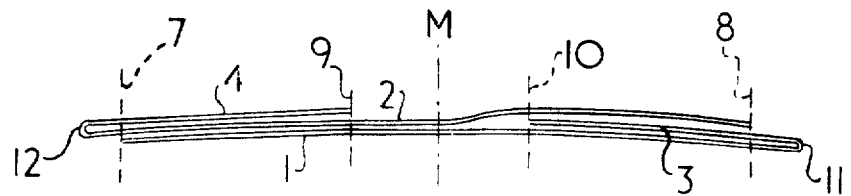
FIGS. 1 and 2 show diagrammatic representations of two different embodiments of folded steel belts in accordance with the invention.

FIG. 1 shows a belt consisting of two plies. In this connection, the first, lower ply 1 extends from an outer peripheral line 7 situated in the tire shoulder region, and is there folded radially outwardly back upon itself forming a folded edge 11 the folded-over portion 3 reaching as far as a first inner peripheral line 10 of the tire.

The second, upper, ply 2 extends from a second outer peripheral line 8 of the tire, which is arranged symmetrically with the first outer peripheral line of the tire relatively to the center M of the tire, over the tire center M to the opposite shoulder region, and there folded radially back upon itself forming a folded edge 12, folded-over portion 4 extending as far as a second inner peripheral line 9 of the tire, which lies symmetrically with the first inner peripheral line 10 of the tire relative to the center M.

Thus, save for the relatively small region between the inner peripheral lines 9,10 of the tire, a threelayered belt is obtained, in which the directions of the bias angle of the threads in the two plies 1,2 are selected in such a way that at all times at least two superimposed layers are biased in the opposite sense to form a cross bracing between adjacent layers over the entire belt width.

Figure 2:
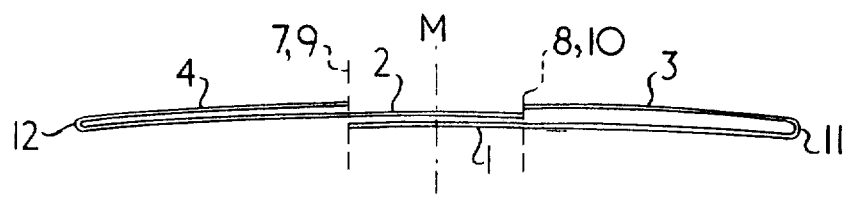

The embodiment shown in FIG. 2 consists of a belt in which the width and arrangement of the plies 1,2 as well as of the folded-over portions 3,4 are selected in such a way that respectively the internal end 9,10 of the folded-over portion of each ply 3,4 coincides substantially with the beginning of the other ply. In this way, a belt is obtained which consists, over the entire width, almost at all times of two superimposed layers of threads of opposite bias angle which form together a cross bracing. The width of the folded-over portions 3,4 can be selected in accordance with the respective practical requirements, and if angular distortions occuring upon the folding step are to be kept small, this width of the folded-over portions can be selected comparatively small.

Figure 3:
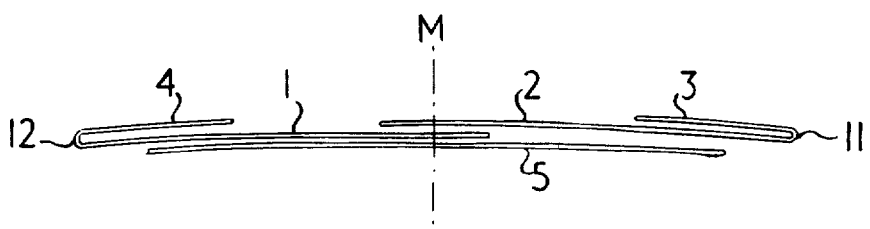
FIGS. 3 and 4 show two further embodiments having an additonal unfolded belt layer.

In the case of the embodiment shown in FIG. 3, an unfolded ply 5 is provided additionally to the two folded plies 1,2 in order to obtain possibilities of still greater variations with regard to the respectively demanded mechanical qualities of the belt, without substantial increase in the expenditure in the construction. Moreover, a symmetrical construction, seen from the angles of intersection, is easier to achieve.

In this embodiment the overlapping region of the non-folded-over portions of the folded plies 1,2 can be limited to a relatively small region in the center of the belt, and also the folded-over portions 3,4 can be designed relatively small, since the demanded mechanical strength in the regions without overlapping of the folded layers 1,2 is ensured by the non-folded ply 5. The bias angles in the threads in the folded plies 1,2 and in the unfolded ply 5 are preferably selected so that over the whole width of the belt a symmetrical arrangement, i.e. a cross bracing arrangement is obtained between two superimposed layers of threads, in which connection the asymmetrical region between the folded plies 1 and 2 does not cause interference, because the symmetry aspired to is obtained by the ply 5 which forms a cross bracing with the ply 1 lying above it. Thus in a preferred embodiment the ply 2 possesses the same thread bias angle, biased in the same direction as the ply 1 although with wider folded over portions 3 and 4, it can consist of threads biased in the opposite direction.

Figure 4:
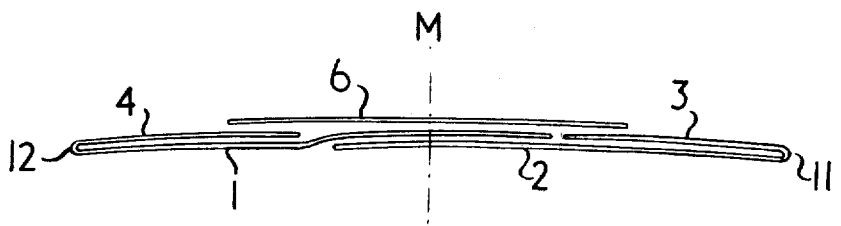

The embodiment shown in FIG. 4 differs from the embodiments shown in FIG. 2 in that arranged above the two folded plies 1,2 is additionally an unfolded ply 6, the width of which is at least somewhat greater than the width of the overlapping region of the unfolded regions of the plies 1,2. The folded plies 1 and 2 can be arranged as in the case of FIG. 3, with regard to folding, overlapping and angle of intersection. Advantageously, the bias angle of the threads in the ply 6 is in the range 15°–90°.

Figure 5:
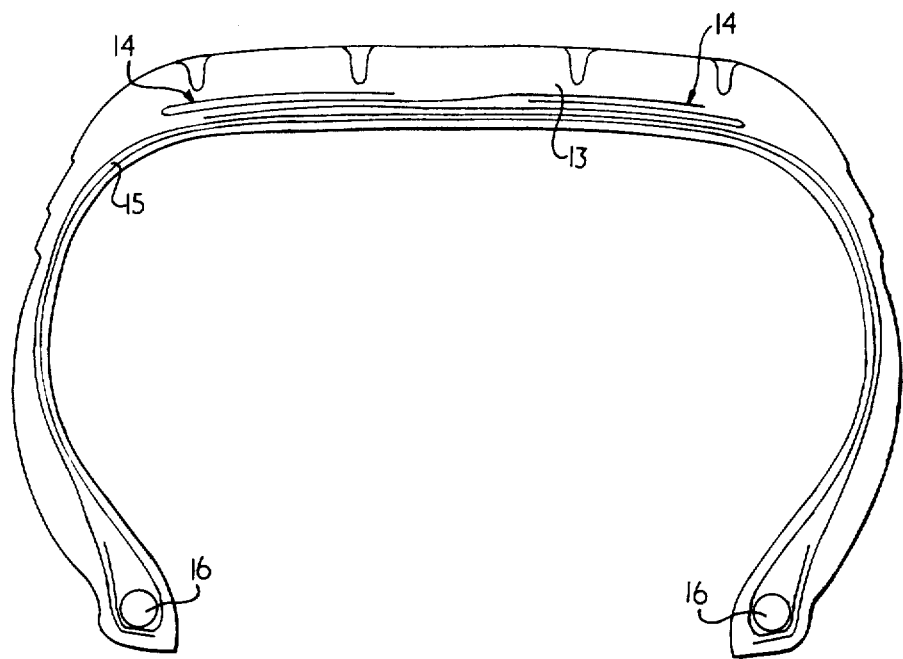
FIG. 5 is a diagrammatic cross-sectional view of a tire containing the belt shown in FIG. 1.

The pneumatic tire shown in FIG. 5 consists of a tread portion 13 braced by a belt 14 of the construction illustrated in FIG. 1, a carcass 15 and beads 16.

The belt 14 is made up of folded plies of steel cords having a bias angle of 18° the unfolded portions of the two plies having the bias in the opposite sense relative to each other.

The carcass 15 consists of a pair of plies of nylon cords extending from bead to bead having equal and opposite bias angles of 88° one ply being turned outwardly around the bead core and the other turned inwardly outside the first, and terminating adjacent the bead toe.

Figure 6:
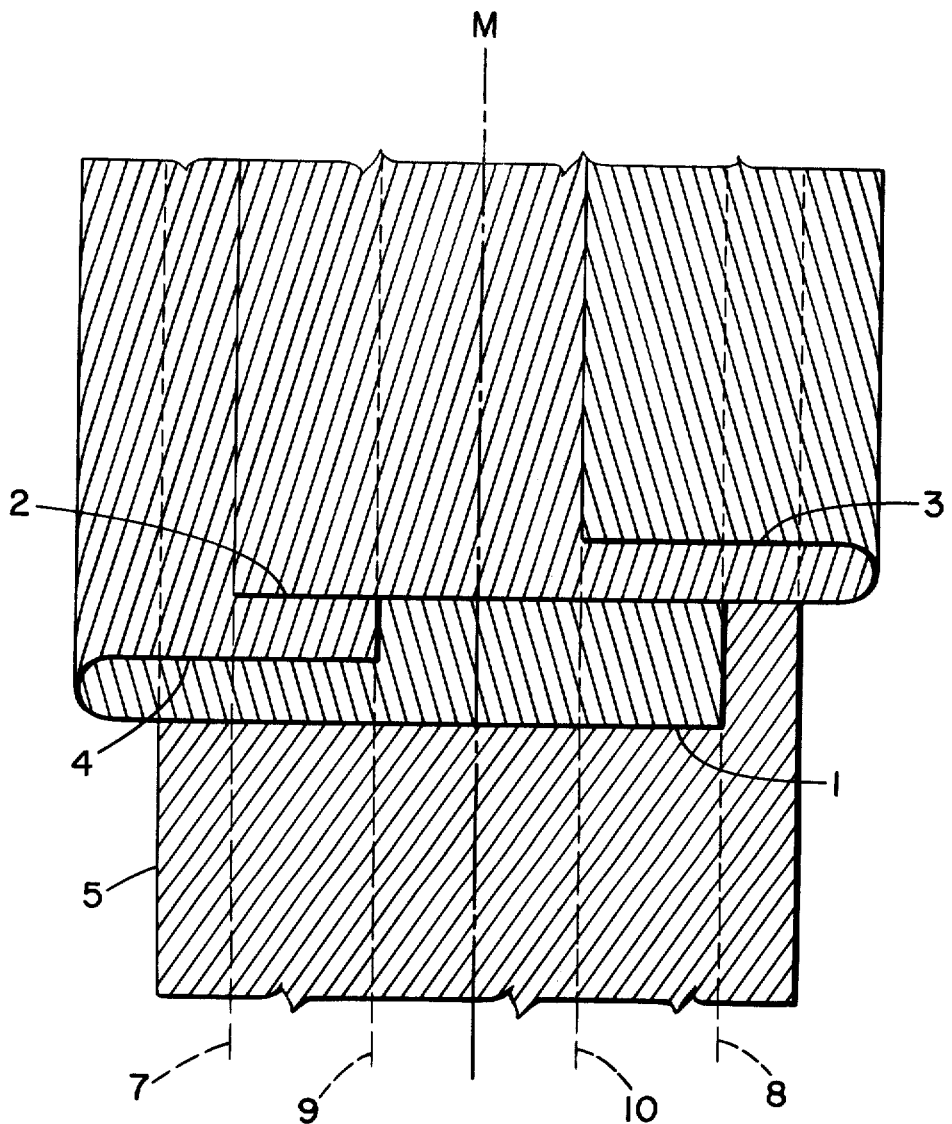
FIG. 6 shows a diagrammatic representation of biased tire belt plies superimposed with the bias of the different plies being of opposite sense to form cross-bracing.

FIG. 6 shows biased plies superimposed so that the bias of each of the layers is in the opposite sense to thereby form cross bracing between them over the entire belt width. A lower ply 1 and second, upper ply 2 each have biased threads forming angles of approximately 10° to 25° with respect to the peripheral lines (7–10) of the tire, but the threads of each ply cross to provide the cross bracing. The plies 1 and 2 also include folded-over portions 4 and 3, respectively. Also shown is unfolded ply layer 5 having threads biased at an angle of 15° to 90° with respect to the peripheral lines (7–10) of the tire.

During the production of the belt it is advantageous that all the plies can initially be laid-on flat and then the folding of the plies can be accomplished practically in a single operation. In this connection it is extremely simple to accurately position the belt edges so that, besides good construction efficiency, also good uniformity can be obtained, which is ensured more especially by the improved joints and by the avoidance of distortion of the individual plies and particularly of the folded portion.

A further advantage is that more rigid types of steel cord can be worked with, since the large-area fixing of the plies before the folding step enables the required exactness of folding to be obtained. More rigid steel cord, e.g. thicker steel cord, is more economically priced, whereby positive advantages in economy are gained.

Having now described my invention what I claim is:

1. A pneumatic tire comprising a tread and carcass and, beneath the tread, a belt of substantially inextensible threads consisting of several at least partially superimposed plies, two of which are folded over to form folded edges one on either side of the center of the belt in which the first ply extends from a predetermined first outer peripheral line of the tire over the tire center to the opposite shoulder region, is there folded radially outwardly back upon itself and is conducted as far as a first inner peripheral line of the tire and the second ply has the same width as the first ply and extends fropm a second outer tire peripheral line, which lies symmetrically with the first outer peripheral line relative to the tire center, over the tire center to the opposite shoulder region, is there folded radially outwardly back upon itself and is conducted as far as a second inner peripheral line of the tire, which lies symmetrically with the first inner peripheral line of the tire relative to the tire center, the width of said two plies of the belt being selected so that on each side of the center of the belt the outer and inner peripheral lines substantially coincide, and the width of each of the folded-over portions of said two plies of the belt is greater than the width of the overlapping region between said inner peripheral lines.

2. A pneumatic tire as claimed in claim 1, in which the belt comprises an additional unfolded ply which is arranged at least in the ply overlap region between said inner peripheral lines.

3. A pneumatic tire as claimed in claim 1, in which the threads of the belt plies form angles of approximately 10° to 25° with respect to the peripheral lines of the tire.

4. A pneumatic tire as claimed in claim 1, in which the threads in at least two superimposed layers are biased in the opposite sense to form cross bracing between them over the entire belt width.

5. A pneumatic tire as claimed in claim 1, in which the belt comprises an unfolded layer consisting of threads forming an angle of 15° to 90° with the peripheral lines of the tire.

6. A pneumatic tire as claimed in claim 1 which comprises plies of steel cord or cables.

7. A pneumatic tire as claimed in claim 1 which comprises beads and a carcass comprising elastomeric material reinforced by threads extending from bead to bead.

8. A pneumatic tire as claimed in claim 7 in which the threads are textile cords and have a bias angle of at least 80°.

* * * * *